United States Patent
Drissner (10) Patent No.: US 11,328,251 B2
(45) Date of Patent: May 10, 2022

(54) VENDING DEVICE WITH INTEGRATED INVENTORY MONITORING

(71) Applicant: Bizerba SE & Co. KG, Balingen (DE)

(72) Inventor: Joerg Drissner, Balingen (DE)

(73) Assignee: BIZERBA SE & Co. KG, Balingen (DE)

( * ) Notice: Subject to any disclaimer, the term of this patent is extended or adjusted under 35 U.S.C. 154(b) by 62 days.

(21) Appl. No.: 16/558,191

(22) Filed: Sep. 2, 2019

(65) Prior Publication Data

US 2020/0082328 A1 Mar. 12, 2020

(30) Foreign Application Priority Data

Sep. 6, 2018 (EP) ..................................... 18000719

(51) Int. Cl.
*G06Q 20/20* (2012.01)
*G01G 19/41* (2006.01)
(Continued)

(52) U.S. Cl.
CPC ....... *G06Q 10/087* (2013.01); *G01G 19/4144* (2013.01); *G01M 1/122* (2013.01)

(58) Field of Classification Search
CPC .. G06Q 10/087; G06Q 20/203; G06Q 20/208; G01G 19/4144; G01G 19/42; G01M 1/122; G07F 9/026; G07G 1/0054
See application file for complete search history.

(56) References Cited

U.S. PATENT DOCUMENTS 10,318,917 B1 * 6/2019 Goldstein ............ G06Q 20/208
2003/0047603 A1 3/2003 Lustenberger et al.
(Continued)

FOREIGN PATENT DOCUMENTS

DE 10045516 A1 3/2002
DE 102017001832 A1 8/2018
(Continued)

OTHER PUBLICATIONS

Yu Cao, Calculation and accuracy analysis of center of gravity of payload rack, Aug. 1, 2011, Proceedings of 2011 6th International Forum on Strategic Technology, vol. 2, pp. 669-673 (Year: 2011).*
(Continued)

*Primary Examiner* — Sangeeta Bahl
*Assistant Examiner* — Aaron N Tutor
(74) *Attorney, Agent, or Firm* — Leydig, Voit & Mayer, Ltd.

(57) ABSTRACT

A vending device has at least one display area and an evaluator. The display area is formed by a rigid body, and has at least two, spatially-separated product areas, the rigid body of the display area being held by force transmission areas of at least two weighing cells. The evaluator is configured to, at periodic intervals or when a total weight detected by the at least two weighing cells changes: determine new coordinates of a center of gravity from data of the weighing cells, and transmit the new coordinates to a controller. The controller is configured to: determine a product area within the display area based upon changes in the coordinates of the center of gravity, determine, from the change in a total weight, the weight of goods removed from or added to the determined product area, and update an inventory, stored in a memory, for the product.

16 Claims, 3 Drawing Sheets

(51) Int. Cl.
     *G01M 1/12*      (2006.01)
     *G06Q 10/08*     (2012.01)
     *G01G 19/414*    (2006.01)

(56) References Cited

U.S. PATENT DOCUMENTS

| | | | | |
|---|---|---|---|---|
| 2014/0316561 | A1* | 10/2014 | Tkachenko | G07F 11/02 |
| | | | | 700/236 |
| 2018/0340856 | A1* | 11/2018 | Wang | G01M 1/12 |
| 2019/0104864 | A1* | 4/2019 | Barnet | G06Q 10/087 |

FOREIGN PATENT DOCUMENTS

| | | | |
|---|---|---|---|
| EP | 1319173 | B1 | 6/2005 |
| JP | H04238597 | A | 8/1992 |

OTHER PUBLICATIONS

U.S. Appl. No. 17/521,885, filed Nov. 9, 2022, pending.

\* cited by examiner

VENDING DEVICE WITH INTEGRATED INVENTORY MONITORING

CROSS-REFERENCE TO PRIOR APPLICATIONS

Priority is claimed to European Patent Application No. 18 000 719.7, filed on Sep. 6, 2018, the entire disclosure of which is hereby incorporated by reference herein.

FIELD

The present invention relates to a vending device with integrated inventory monitoring.

BACKGROUND

DE 100 45 516 A1 shows a sales counter for ice cream, wherein access to a specific ice cream container is determined by means of light barriers, and the number of sold ice cream scoops per type is deduced therefrom. Weight sensors which determine the total mass of the ice-cream container are also provided for each ice cream container.

SUMMARY

An embodiment of the present invention provides a vending device that has at least one display area and an evaluator. The display area is formed by a rigid body, and has at least two, spatially-separated product areas, the rigid body of the display area being held by force transmission areas of at least two weighing cells. The evaluator is configured to, at periodic intervals or when a total weight detected by the at least two weighing cells changes: determine new coordinates of a center of gravity from data of the weighing cells, and transmit the new coordinates to a controller. The controller is configured to: determine a product area within the display area based upon changes in the coordinates of the center of gravity, determine, from the change in a total weight, the weight of goods removed from or added to the determined product area, and update an inventory, stored in a memory, for the product.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Embodiments of the present invention provide a vending device that makes the sales process in the self-service area in a retail shop more efficient, and, in particular, monitors the inventory.

An embodiment of the present invention provides a vending device with integrated inventory monitoring. With the vending device, baked goods, vegetables, or fruit—in particular, for self-service sales—are offered in supermarkets or in specialty shops, for example. The vending device automatically determines the inventory of goods present in individual product areas. An embodiment of the invention further provides to a method for operating a vending device.

According to the invention, a vending device for, in particular, baked goods, fruit, or vegetables, consisting of at least one display area, is provided. The display area is formed by a rigid body. The display area includes at least two, spatially-separated product areas. The rigid body of the display area is held by the force transmission areas of at least two weighing cells. The vending device includes an evaluation unit which, at periodic intervals or when the total weight detected by the at least two weighing cells changes, is designed to determine new coordinates of the center of gravity from the data of the weighing cells. The vending device includes a control unit which is designed to determine a product area within the display area based upon changes in the coordinates of the center of gravity. The control unit is designed to determine, from the change in the total weight, the weight of the goods removed or added in the determined product area and to update the inventory. In one embodiment, the vending device is a vending device for self-service sales. In one embodiment, the vending device is a bread shelf for offering baked goods in a supermarket, from which the customer can take and package various baked goods from different shelf areas (product areas), paying for them later at the cash register. In one embodiment, the vending device is a shelf for fruit or vegetables that includes several product areas for different goods and offers them to the customer for taking them and later paying at the cash register. Common to all these devices is that, according to the prior art, when a certain good runs out or falls below a minimum number of units, an employee of the supermarket must be informed by a customer or must check the inventory at regular intervals in order to replenish in good time the goods which have fallen below a certain minimum number of units. The advantage of the invention is that the vending device automatically determines the inventory. In the context of the inventory monitoring of the vending device, an appropriate responsible person can then be prompted by the vending device to replenish the inventory.

In one embodiment, the vending device includes three or four weighing cells, which hold the rigid body of the display area. The person skilled in the art understands that these are three or four weighing cells per rigid body. If the vending device includes more than one display area with more than one rigid body, there is a corresponding number of weighing cells per rigid body.

In one embodiment, the control unit is designed to determine, from the total weight of goods removed or added and an average weight per good assigned to a product area, a count of goods removed or added.

In one embodiment, the control unit is designed to update the inventory within each product area based upon the removed or added goods.

In one embodiment, all weighing cells are periodically and simultaneously tared.

In one embodiment, the evaluation unit is designed to determine, when the total weight changes, a vector between the previous coordinates of the center of gravity and the new coordinates of the center of gravity. The evaluation unit is designed to determine a product area from the vector and the total weight. This product area corresponds to the product area from which the goods were removed or to which they were added.

In one embodiment, the vending device includes a memory in which appropriate product information, in particular, the weight per good/unit, is assigned to the product areas in the display area.

In one embodiment, the vending device includes a communications unit that sends or outputs a message when the inventory in a product area falls below a threshold value assigned to the product area. For example, the vending device may thus output a message with a display or a system light, which indicates to an operator that the inventory of a product is too low. On the other hand, the vending device can also send a message to a control room of the supermarket by means of e-mail or other electronic communication, which notifies an operator that the inventory of a product is too low. On the other hand, the vending device may also send a message to a baking oven, indicating, for example, the low inventory of a particular baked product and, possibly, automatically causing the baking oven to bake this baked product.

The invention further relates to a method for operating a vending device for, in particular, baked goods, fruit, or vegetables. The vending device includes a display area, wherein the display area is formed by a rigid body and wherein the display area includes at least two, spatially-separated product areas. The rigid body of the display area is held by the force transmission areas of at least two weighing cells. The method includes the step of receiving a signal of the at least two—preferably, three or four—weighing cells, wherein the signals correspond to the weight forces in the region of the corners of the rigid body. The method further includes the step of determining with an evaluation unit the coordinates of the center of gravity and a total weight force from the received signals. The method further includes the step of receiving a signal corresponding to a new weight force from at least one weighing cell and determining with the evaluation unit new coordinates of the center of gravity from the data currently received from the weighing cells. The method further includes the step of determining a product area and a weight of goods added to or removed from the product area. The method further includes the step of updating the inventory assigned to each product area.

In one embodiment, the method includes the step of periodically taring all the weighing cells. Furthermore, the method includes the step of determining new coordinates of the center of gravity and a new total weight with the new weighing data when the weight measured by at least one weighing cell changes.

In one embodiment, the method includes the step of determining new coordinates of the center of gravity with the new weighing data and the step of determining a vector between the previous coordinates of the center of gravity and the new coordinates of the center of gravity when the weight measured by at least one weighing cell changes. The method further includes the step of assigning a product area on the basis of the determined vector and the total weight. Furthermore, the method includes the step of determining the weight of the goods added to or removed from the assigned product area. Furthermore, the method includes the step of determining a count of goods based upon the weight of the removed or added goods and a weight per good/unit.

In one embodiment, the method includes the step of comparing the updated inventory in the assigned product area with a threshold value defined for the product area, and, if the updated inventory falls below the threshold value, the step of sending or displaying information that the threshold value has been undershot.

Some embodiments of the invention are shown by way of example in the drawings and are described in the following.

Figure 1:
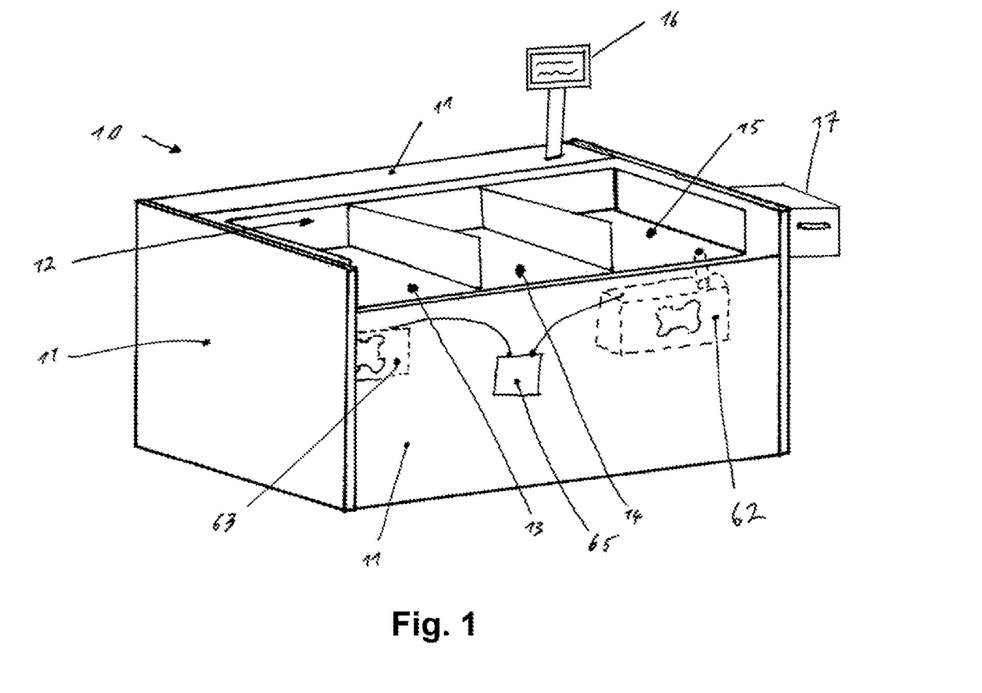
FIG. 1 illustrates a vending device according to an embodiment of the invention.

FIG. 1 shows a vending device 10 according to an embodiment of the invention. The vending device 10 is suitable for self-service sales of, for example, baked goods, fruit and vegetables. The vending device 10 has a counter including a fixed frame 11 and a display area 12. The display area 12 includes three product areas 13, 14, 15 in which various products (not shown) lie. The customers can take the products from the individual product areas, and package them and later pay at the cash register. FIG. 1 shows, by way of example, a vending device with a display area 12, which includes three product areas. However, the display area 12 may also include a higher number of product areas, which are arranged next to one another or, if appropriate, also in a matrix. The vending device can also include, for example, several display areas 12, which are arranged one above the other, each of which in turn includes several product areas. Furthermore, each product area can also be closed on the front side or, for example, include a door which can be opened by the customer, as is known to the person skilled in the art from, for example, self-service devices for bread sales. The display area 12 itself or at least the bottom of the display area forms a rigid body. For example, the display area itself may consist of a rigid plate or be mounted on a rigid frame. The rigid body of the display area is supported by four weighing cells 61, 62, 63, 64, each of which is mounted near the corners of the display area and of which only the two front weighing cells 62, 63 are shown in FIG. 1. The rigid body is respectively connected to the force transmission areas of the weighing cells 61, 62, 63, 64. The stationary sides of the weighing cells 61, 62, 63, 64 are each mechanically fixedly connected to the frame 11 of the vending device. The weighing cells 61, 62, 63, 64 are connected with their signal outputs to an evaluation unit (or evaluator) 65. The frame 11 of the vending device carries a display 16 on which the inventory in the respective product areas is indicated and which serves to operate the vending device. The display is preferably designed as a touchscreen and can likewise be designed as a releasable tablet computer. The display can likewise be set up in a control room and communicate with the vending device via a network.

Figure 2A:
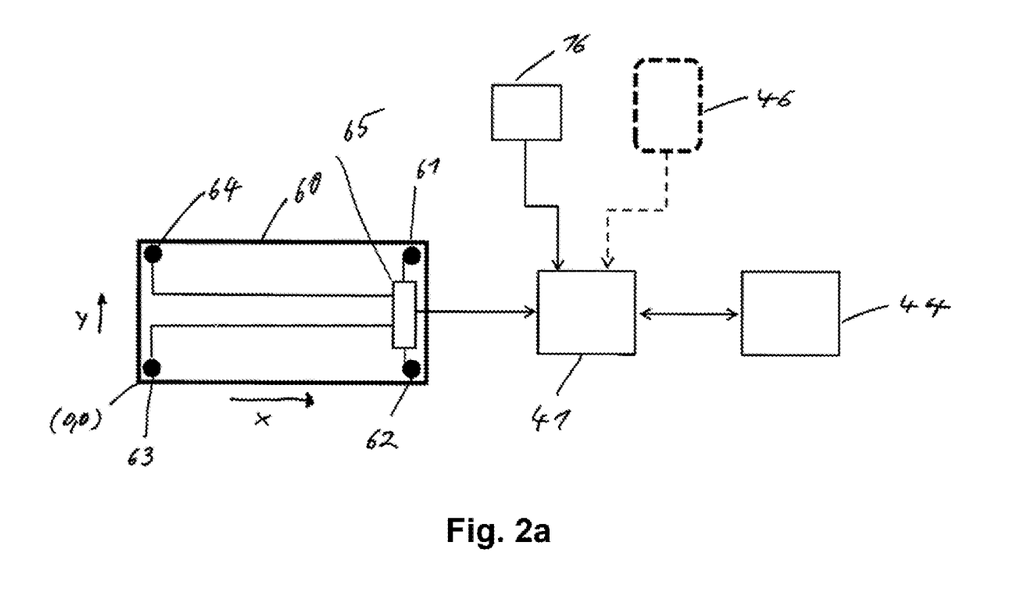
FIG. 2a and FIG. 2b illustrate block diagrams of a vending device according to a first embodiment and second embodiment of the invention, respectively.

FIG. 2a schematically shows the display area of a vending device 10 according to the invention and the corresponding components for inventory monitoring. The product area from which a product was removed or to which a product was added is determined by determining the center of gravity of the rigid body 60 which forms the display area 12.

The rigid body 60 is suspended from four weighing cells 61, 62, 63, 64. With their force transmission sides, the weighing cells 61, 62, 63, 64 support the rigid body 60 at its corners or in the vicinity of the corners. The weighing cells 61, 62, 63, 64 independently determine an effective weight force produced by the rigid body 60 and the products placed into the product areas. In this case, a single weight force acts on each weighing cell 61, 62, 63, 64 in proportion to the total weight. The data from the weighing cells 61, 62, 63, 64 are transmitted to an evaluation unit 65. The evaluation unit determines coordinates of the center of gravity of the rigid body 60 from the individual weight data of the weighing cells 61, 62, 63, 64. The coordinates in the display area 12 start in a corner at the weighing cell 63 with the coordinates (0, 0) and extend in the horizontal direction X and in the vertical direction Y.

In order to illustrate the determination of the center of gravity, the corresponding weight data W61, W62, W63, W64 are assigned to the weighing cells 61, 62, 63, 64, as shown in FIG. 2*a*.

The formation of the center of gravity in the X direction is determined as follows:

$$(W61+W62)/(W61+W62+W63+W64)$$

The formation of the center of gravity in the Y direction is determined as follows:

$$(W61+W64)/(W61+W62+W63+W64)$$

With a corresponding normalization factor, which takes into account the size of the rigid body 60, coordinates in the display area corresponding to the coordinates of the center of gravity of the rigid body can be determined. These coordinates are determined in the evaluation unit 65 on the basis of the data of the weighing cells 61, 62, 63, 64. Furthermore, the evaluation unit 65 forms a total weight W61+W62+W63+W64. The coordinates of the center of gravity and the total weight are transmitted by the evaluation unit 65 to a control device (or controller or control unit) 41. The vending device includes a memory 44 in which an assignment between coordinates of the center of gravity and product area 13, 14, 15 is stored. For each product area 13, 14, 15, the average weight of a unit of a good in this product area is, moreover, stored in the memory 44. Stored in the memory 44 for each product area 13, 14, 15 is the current inventory, i.e., the current number of goods/units in this product area 13, 14, 15. With this arrangement, in addition to the product areas 13, 14, 15 shown in FIG. 1 which are arranged next to one another in the X direction, it is also possible to determine product areas which are arranged in rows and columns in the X and Y directions, i.e., in a matrix.

Figure 2B:
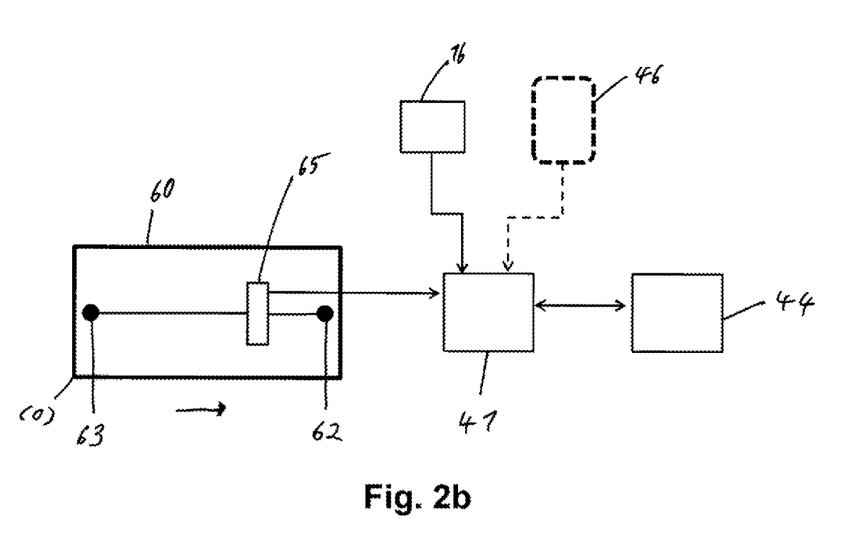

FIG. 2*b* shows a system with two weighing cells 62, 63, with which system only the determination of a product area in the X direction is possible.

The formation of the center of gravity in the X direction is determined as follows:

$$(W62)/(W62+W63)$$

For a vending device as shown in FIG. 1, in which the product areas 13, 14, 15 are arranged next to one another in the X direction, such a system is sufficient.

Figure 3:
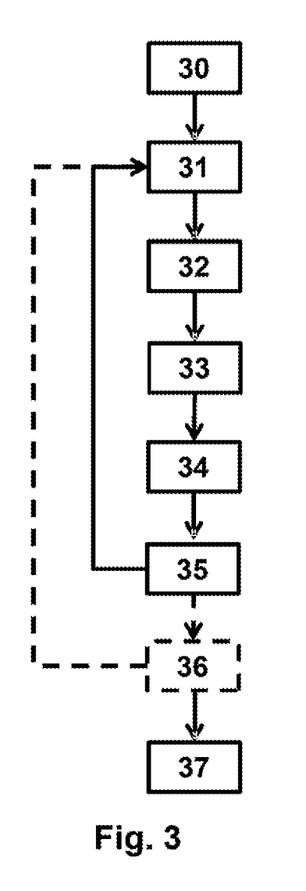
FIG. 3 illustrates a method for operating a vending device according to an embodiment of the invention.

FIG. 3 shows a method for operating a vending device for, in particular, baked goods, fruit, or vegetables. In step 30, the product areas 13, 14, 15 in the display area 12 of the vending device are loaded with goods. In the process, the good is assigned to each product area 13, 14, 15, and a weight per unit is stored in the memory. This weight is the average weight per unit, since the weight of baked goods, for example, can differ slightly. However, the deviations are in a range and are statistically distributed such that they are not relevant for the method. Furthermore, the number of goods which are located in the product area after filling the vending device is stored in the memory 44 for each product area 13, 14, 15. Furthermore, the X and Y coordinates of each product area 13, 14, 15 are stored in the memory 44. These coordinates do not have to be newly stored with each filling, since they do not change. However, if the size of the product areas and their arrangement are changed by rearrangement of the intermediate walls, the assignment between X and Y coordinates and product areas 13, 14, 15 must be updated in the memory. It is thus stored in the memory over which X and Y coordinates each product area 13, 14, 15 extends. In addition, a threshold value for each product area is stored in the memory 44; when this threshold value is undershot, the vending device outputs a message that fresh goods have to be replenished in this product area 13, 14, 15. In step 31, an evaluation unit 65 determines, from the weight values of the weighing cells 61, 62, 63, 64, a location where a good or goods were removed or added and the total weight of the removed or added products. The determination in step 31 can be carried out with two alternative methods, which are described below with reference to FIG. 4 and FIG. 5. In step 32, the control device 41 determines the assigned product area 13, 14, 15 on the basis of the coordinates of the location where something was removed or added and by means of the information from the memory 44 about the arrangement of the product areas 13, 14, 15. In step 33, the number of goods removed from or added to the product area 13, 14, 15 is determined from the determined total weight of the removed goods and the weight value for a good assigned to the product area 13, 14, 15 in the memory. The number of units removed is thus determined. In step 34, the current inventory assigned to the product area 13, 14, 15 is reduced—if appropriate, increased—by the number of removed goods. The method is then continued with step 30 with the removal or addition of another good. Alternatively, the method may be continued with step 35, in which a label is printed for the most recently removed good(s). The label is printed, for example, after a customer has completed his removals and they have been added up. The label can be printed for a single removal or as a sum label for several goods from several product areas. For example, the label may be glued by the customer onto a bag into which he placed his goods, and the label may serve as the basis for the payment process at the cash register. After printing the label, the method continues with step 30. If a threshold value stored in the memory 44 for the inventory in a product area 13, 14, 15 is undershot, the method sends a message to an operator, in step 36, so that he is informed that the inventory has reached a low level and has to be replenished. If the vending device is a vending device for baked goods, the message can also be sent to a baking oven, which then bakes the corresponding product automatically or as arranged by an operator. For example, the message sent in step 36 may automatically cause a baking oven to preheat and come to operating temperature, and be sent simultaneously to a mobile terminal of an operator to inform him that he is to load the baking oven with the corresponding product. In step 37, new information about the inventory is entered by the operator, if he has replenished a product area with fresh goods. The information in the memory 44 about the inventory in this product area 13, 14, 15 is then updated accordingly, as prompted by the operator input.

Figure 4:
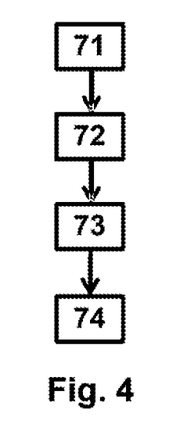
FIG. 4 illustrates a first method for determining a location where a product was removed or added.

FIG. 4 schematically shows a method for determining a location in the display area 12 where a good was added or removed. In step 71, all the weighing cells 61, 62, 63, 64 are tared, i.e., the rigid body 60 and all of the goods placed thereon are treated as if they were a preload for the weighing cells 61, 62, 63, 64 and are set to zero. In step 72, a new weight value is measured by at least one weighing cell 61, 62, 63, 64 and received by the evaluation device 65. In step 73, the evaluation device 65 calculates coordinates of the center of gravity on the basis of the current weight data of the weighing cells 61, 62, 63, 64. These coordinates of the center of gravity do not reflect the center of gravity of the rigid body 60, but rather the center of gravity of the change in weight in the coordinate system of the display area 12. This is the location where a good was removed from or added to the display area. In step 74, this location and the change in weight are passed to the control device 41.

Figure 5:
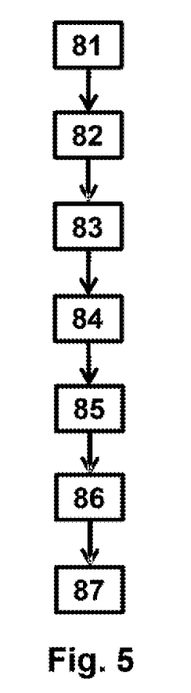
FIG. 5 illustrates a second method for determining a location where a product was removed or added.

FIG. 5 schematically shows a method for determining a location on the display area 12 where a good was added or removed. In step 81, the coordinates of the current center of gravity of the rigid body, including all of the goods placed thereon, are determined. This is the true center of gravity. The rigid body, or at least the goods placed thereon, are not tared. In step 82, a new weight value is measured by at least one weighing cell 61, 62, 63, 64 and received by the evaluation device 65. In step 83, new coordinates of the center of gravity are determined by the evaluation device 65 from the new data of the weighing cells 61, 62, 63, 64. In step 84, a vector reflecting the shift in the coordinates of the center of gravity is formed from the previous coordinates of the center of gravity and the new coordinates of the center of gravity. Starting from the previous center of gravity, the vector leads to the new center of gravity unless the vector is scaled. In step 85, the vector is, subsequently, inversely proportionally scaled with the aid of the total weight of the rigid body and the goods placed thereon. The location where a product was removed from or placed into the display area 12 results from step 86, in which the scaled vector is added to the previous coordinates of the center of gravity. In step 87, this location and the change in weight are passed to the control device 41.

The functions of various elements shown in the drawings, including the functional blocks, may be realized by dedicated hardware, or by generic hardware capable of executing software in conjunction with the corresponding software. If the functions are provided by means of a processor, they may be provided by a single dedicated processor, a single shared processor, or several generic processors, which in turn may be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vending device, the vending device comprising:
at least one display area, wherein the display area is formed by a rigid body, wherein the display area comprises at least two, spatially-separated product areas, wherein the rigid body of the display area is held by force transmission areas of at least two weighing cells, and
an evaluator, the evaluator being configured to, at periodic intervals or when a total weight detected by the at least two weighing cells changes:
determine new coordinates of a center of gravity from data of the weighing cells, and
transmit the new coordinates to a controller,
wherein the controller is configured to:
determine a product area within the display area based upon changes in the coordinates of the center of gravity,
determine, from the change in a total weight, the weight of goods removed from or added to the determined product area, and
update an inventory, stored in a memory, for a product associated with the determined product area,
wherein the evaluator is configured to determine, upon detecting a change in the total weight, a vector between previous coordinates of the center of gravity and the new coordinates of the center of gravity, and to determine the product area from the vector and the total weight,
wherein the center of gravity is the center of gravity of the rigid body in a state where a plurality of goods are in the display area,
wherein the evaluator is configured to determine the previous coordinates of the center of gravity of the rigid body in the state where the plurality of goods are in the display area,
wherein the vector corresponds to a shift in the coordinates of the center of gravity from the previous coordinates to the new coordinates, and
wherein the determining of the product area from the vector and the total weight comprises:
inversely proportionally scaling the vector using the total weight; and
adding the scaled vector to the previous coordinates of the center of gravity to determine a location where at least one of the plurality of goods was removed or added from the display area, and
wherein the determining of the product area comprises determining the product area based upon the location where at least one of the plurality of goods was removed.

2. The vending device according to claim 1, wherein the vending device is a vending device for self-service sales.

3. The vending device according to claim 2, wherein the vending device comprises three or four weighing cells which hold the rigid body of the display area.

4. The vending device according to claim 1, wherein the controller is configured to determine, from the total weight of the removed or added goods and an average weight per good, the average weight being assigned to the product area, a count of the removed or added goods.

5. The vending device according to claim 1, wherein the controller updates the inventory within each product area, comprising the product area, on the basis of the removed or added goods.

6. The vending device according to claim 1, wherein the weighing cells are tared periodically and simultaneously.

7. The vending device according to claim 1, wherein the controller is configured to store in the memory corresponding product information assigned to the product areas in the display area.

8. The vending device according to claim 1, wherein the vending device is configured to send or output a message if the inventory in the product area falls below a threshold value assigned to the product area.

9. A method for operating a vending device, wherein the vending device comprises a display area, wherein the display area is formed by a rigid body and wherein the display area comprises at least two, spatially-separated product areas, and wherein the rigid body of the display area is held by force transmission areas of at least two weighing cells, wherein the method comprises the following steps:
  receiving a signal of the at least two weighing cells, wherein the signal of each of the weighing cells corresponds to respective weight forces in a region of a corner of the rigid body,
  determining coordinates of the center of gravity and a total weight force from the received signals,
  receiving the signal corresponding to a new weight force from at least one weighing cell and determining new coordinates of a center of gravity from data currently received from the weighing cells,
  determining a product area and a weight of goods removed from or added to the product area, the weight of goods removed from or added to the product area being determined based upon a change in the total weight, and
  updating an inventory assigned to the product area,
  determining, upon detecting the change in the total weight, a vector between previous coordinates of the center of gravity and the new coordinates of the center of gravity, and determining the product area from the vector and the total weight,
  wherein the center of gravity is the center of gravity of the rigid body in a state where a plurality of goods are in the display area,
  determine the previous coordinates of the center of gravity of the rigid body in the state where the plurality of goods are in the display area,
  wherein the vector corresponds to a shift in the coordinates of the center of gravity from the previous coordinates to the new coordinates, and
  wherein the determining of the product area from the vector and the total weight comprises:
    inversely proportionally scaling the vector using the total weight; and
    adding the scaled vector to the previous coordinates of the center of gravity to determine a location where at least one of the plurality of goods was removed or added from the display area, and
  wherein the determining of the product area comprises determining the product area based upon the location where at least one of the plurality of goods was removed.

10. The method according to claim 9, the method further comprising the following steps:
  periodically taring all of the weighing cells, and
  determining new coordinates of the center of gravity and a new total weight using the new weighing data when the weight measured by at least one weighing cell changes.

11. The method according to claim 10, further comprising the following steps:
  determining a count of goods on the basis of the weight of the removed or added goods and a weight per good.

12. The method according to claim 11, the method further comprising the following steps:
  comparing the updated inventory in the assigned product area with a threshold value defined for the product area, and
  sending or displaying information that the threshold value has been undershot, if the updated inventory falls below the threshold value.

13. The vending device according to claim 1,
  wherein the rigid body of the display area is held by four weighing cells, the four weighing cells comprising the at least two weighing cells, the four weighing cells being a first weighing cell, a second weighing cell, a third weighing cell, and a fourth weighing cell,
  wherein the new coordinates of the center of gravity comprise an X-direction coordinate and a Y-direction coordinate,
  wherein the evaluator is configured to, at periodic intervals or when the total weight detected by the four weighing cells changes:
    determine the new coordinates of the center of gravity from the data of the four weighing cells by:
      determining the X-direction coordinate according to: $(W1+W2)/(W1+W2+W3+W4)$; and
      determining the Y-direction coordinate according to: $(W1+W4)/(W1+W2+W3+W4)$,
  wherein $W1$ is a weight data of the first weighing cell, $W2$ is a weight data of the second weighting cell, $W3$ is a weight data of the third weighing cell, and $W4$ is a weight data of the fourth weighing cell,
  wherein the data of the four weighing cells comprises the weight data $W1$, the weight data $W2$, the weight data $W3$, and the weight data $W4$,
  wherein the first weighing cell has a same X-direction coordinate as the second weighing cell,
  wherein the first weighing cell has the same Y-direction coordinate as the fourth weighting cell, and
  wherein the third weighing cell has the same X-direction coordinate as the fourth weighing cell.

14. The vending device according to claim 1,
  wherein the evaluator is configured to, prior the periodic intervals or prior to when the total weight detected by the at least two weighing cells changes, tarring each of the weighting cells in a condition wherein a plurality of goods are in the product areas,
  wherein determining the new coordinates of the center of gravity is based on a current weight data of the weighing cells with respect to the tarred weighting cells, and
  wherein the center of gravity corresponds to a center of gravity of a change in weight in a coordinate system of the display area and not to a center of gravity of the rigid body.

15. The vending device according to claim 1,
  wherein the rigid body of the display area is held by four weighing cells, the four weighing cells comprising the at least two weighing cells, the four weighing cells being a first weighing cell, a second weighing cell, a third weighing cell, and a fourth weighing cell,
  wherein the display area has an associated X-Y coordinate system where coordinates in the display area start at a first corner at the third weighing cell, extend in a horizontal X-direction to the second weighing cell, and extend in a vertical Y-direction to the fourth weighing cell, wherein the new coordinates of the center of gravity comprise a component in the X-direction coordinate and a component in the Y-direction, wherein a first one of the spatially-separated product areas is associated with a first area defined within the X-Y coordinate system, and a second one of the spatially-separated product areas is associated with a second area defined within the X-Y coordinate system, wherein a wall separates the specially-separated product areas, wherein the controller is configured to associate a first plurality of goods with only the first one of the spatially-separated product areas, and a second plurality of goods with only the second one of the spatially separated product areas, and wherein the product is associated with one of the first plurality of goods or the second plurality of goods.

16. The vending machine according to claim 15, wherein the controller is configured to define all of the first plurality of goods as being a particular one of either a baked good product, a fruit product, or a vegetable product, and is configured to define all of the second plurality of goods as being a particular one of either the baked good product, a fruit product, or the vegetable product, different from the first plurality of goods.

* * * * *